(12) United States Patent
Leblang et al.

(10) Patent No.: US 7,996,396 B2
(45) Date of Patent: Aug. 9, 2011

(54) IDENTIFYING THE ITEMS MOST RELEVANT TO A CURRENT QUERY BASED ON USER ACTIVITY WITH RESPECT TO THE RESULTS OF SIMILAR QUERIES

(75) Inventors: Jonathan Leblang, Menlo Park, CA (US); Ruben Ortega, Seattle, WA (US); Colin Saunders, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 152 days.

(21) Appl. No.: 11/392,993

(22) Filed: Mar. 28, 2006

(65) Prior Publication Data

US 2007/0239713 A1    Oct. 11, 2007

(51) Int. Cl.
*G06F 17/30* (2006.01)
(52) U.S. Cl. ......... 707/727; 707/748; 707/759; 707/769
(58) Field of Classification Search ........................ None
See application file for complete search history.

(56) References Cited

U.S. PATENT DOCUMENTS

| | | |
|---|---|---|
| 4,996,642 A | 2/1991 | Hey |
| 5,446,891 A | 8/1995 | Kaplan et al. |
| 5,640,553 A | 6/1997 | Schultz |
| 5,748,954 A | 5/1998 | Mauldin |
| 5,754,237 A | 5/1998 | Jung |
| 5,826,261 A | 10/1998 | Spencer |
| 5,875,443 A | 2/1999 | Nielsen |
| 5,877,485 A | 3/1999 | Swartz |

(Continued)

FOREIGN PATENT DOCUMENTS

EP    0 751 471 A1    1/1997

(Continued)

OTHER PUBLICATIONS

"Direct Hit Search Engine," http://web.archive.org/web/20000816061012/directhit.com/about/products/search_engine.html, Aug. 16, 2000.

(Continued)

*Primary Examiner* — Pierre M Vital
*Assistant Examiner* — Mohammad S Rostami
(74) *Attorney, Agent, or Firm* — Kilpatrick Townsend and Stockton LLP

(57) ABSTRACT

A facility for ranking in a result set is described. The facility establishes a system of ratings for combinations of a web page with the query term that reflect the level of relevance of the web page to the query term. In response to each of a number of content interactions performed by users, each with respect to a result corresponding to a web page included in a result set that was generated in response to a query comprising a set of one or more query terms, the facility adjusts a rating score for each combination of the web page and a query term among the set of query terms. For each of a number of web pages included as results in a distinguished result set produced in response to a distinguished query comprising a set of distinguished query terms, the facility (1) selects established and adjusted reading scores for each combination of the web page and a query term among the distinguished set of query terms, and (2) determines a ranking score for the result in the distinguished result set by combining the selected reading scores.

30 Claims, 7 Drawing Sheets

U.S. PATENT DOCUMENTS

| | | | |
|---|---|---|---|
| 5,920,859 A | | 7/1999 | Li |
| 6,006,222 A | | 12/1999 | Culliss |
| 6,006,225 A | | 12/1999 | Bowman et al. |
| 6,014,665 A | | 1/2000 | Culliss |
| 6,064,980 A | | 5/2000 | Jacobi et al. |
| 6,185,558 B1 | | 2/2001 | Bowman et al. |
| 6,202,058 B1 | | 3/2001 | Rose et al. |
| 6,421,675 B1 | | 7/2002 | Ryan et al. |
| 6,546,388 B1 | | 4/2003 | Edlund et al. |
| 6,549,941 B1 | | 4/2003 | Jaquith et al. |
| 6,631,372 B1 | | 10/2003 | Graham |
| 6,640,218 B1 | * | 10/2003 | Golding et al. ............ 707/2 |
| 6,691,163 B1 | | 2/2004 | Tufts |
| 6,865,571 B2 | | 3/2005 | Inaba et al. |
| 7,124,129 B2 | * | 10/2006 | Bowman et al. ............ 707/5 |
| 7,133,870 B1 | * | 11/2006 | Tripp et al. ............ 707/10 |
| 7,225,182 B2 | * | 5/2007 | Paine et al. ............ 707/3 |
| 7,243,102 B1 | * | 7/2007 | Naam et al. ............ 707/7 |
| 7,302,426 B2 | * | 11/2007 | Bier ............ 707/3 |
| 7,305,390 B2 | * | 12/2007 | Bowman et al. ............ 707/5 |
| 7,318,057 B2 | * | 1/2008 | Aridor et al. ............ 707/3 |
| 7,424,488 B2 | * | 9/2008 | Aggarwal et al. ............ 707/102 |
| 2001/0042064 A1 | | 11/2001 | Davis et al. |
| 2001/0049688 A1 | * | 12/2001 | Fratkina et al. ............ 707/104.1 |
| 2002/0103798 A1 | * | 8/2002 | Abrol et al. ............ 707/5 |
| 2002/0123988 A1 | | 9/2002 | Dean et al. |
| 2002/0147895 A1 | * | 10/2002 | Glance et al. ............ 711/158 |
| 2002/0198882 A1 | * | 12/2002 | Linden et al. ............ 707/10 |
| 2003/0172075 A1 | | 9/2003 | Reisman |
| 2004/0024739 A1 | * | 2/2004 | Copperman et al. ............ 707/1 |
| 2004/0083127 A1 | | 4/2004 | Lunsford et al. |
| 2004/0260688 A1 | * | 12/2004 | Gross ............ 707/3 |
| 2004/0267723 A1 | * | 12/2004 | Bharat ............ 707/3 |
| 2005/0131866 A1 | * | 6/2005 | Badros et al. ............ 707/3 |
| 2005/0222981 A1 | * | 10/2005 | Lawrence et al. ............ 707/3 |
| 2006/0004607 A1 | * | 1/2006 | Marshall et al. ............ 705/2 |
| 2006/0004711 A1 | * | 1/2006 | Naam ............ 707/3 |
| 2006/0106757 A1 | * | 5/2006 | Sakai et al. ............ 707/2 |
| 2006/0112098 A1 | * | 5/2006 | Renshaw et al. ............ 707/7 |
| 2006/0179053 A1 | * | 8/2006 | von Ahn Arellano et al. ..... 707/6 |
| 2006/0195325 A1 | * | 8/2006 | Tateson et al. ............ 705/1 |
| 2006/0224938 A1 | * | 10/2006 | Fikes et al. ............ 715/500 |
| 2006/0271691 A1 | * | 11/2006 | Jacobs et al. ............ 709/228 |
| 2007/0016553 A1 | * | 1/2007 | Dumais et al. ............ 707/2 |
| 2007/0100796 A1 | * | 5/2007 | Wang ............ 707/3 |
| 2007/0106659 A1 | * | 5/2007 | Lu et al. ............ 707/5 |
| 2007/0112768 A1 | * | 5/2007 | Majumder ............ 707/7 |
| 2007/0130145 A1 | * | 6/2007 | Pedersen et al. ............ 707/9 |
| 2007/0162424 A1 | * | 7/2007 | Jeh et al. ............ 707/2 |

FOREIGN PATENT DOCUMENTS

| | | |
|---|---|---|
| WO | WO 95/29451 A1 | 11/1995 |
| WO | WO 99/06924 A1 | 2/1999 |
| WO | WO 02/19167 A2 | 3/2002 |
| WO | WO 02/19167 A3 | 3/2002 |

OTHER PUBLICATIONS

"Direct Hit Shopping Engine," http://web.archive.org/web/200001027051006/directhit.com/about/products/shopping_engine.html, Oct. 27, 2000.

"Distributed Search Patent," located at <http://software.inforseek.com/patents/dist_search/Default.htm>, accessed Dec. 21, 1998.

"Infoseek Gets Patent on Internet Search Technique," located at <http://software.infoseek.com/patent/dist_search/bg_info.htm>, accessed Dec. 21, 1998.

"PLS Speeds Time to Market for Content-Rich Web Sites With PI Web Turbo Version 2.6; New Version Delivers Open Platform Support and Flexible Interface Design," *PR Newswire, Financial News Section*, Sep. 1996.

"Sageware Introduces Knowledge Sets for Verity's Line of Information searching Products," *PR Newswire, Financial News section*, May 1996.

"Searching Far and Wide: The Powerful Document Retrieval Software of PLS, Part 2," *Seybold Report on Desktop Publishing*, Apr. 1996, vol. 10, No. 8.

"Searching Far and Wide: The Powerful Document Retrieval Software of PLS, Part 3," *Seybold Report on Desktop Publishing*, Apr. 1996, vol. 10, No. 8.

Banet, "Searching Far and Wide: The Powerful Document Retrieval Software of PLS, Part 1," *Seybold Report on Desktop Publishing*, Apr. 1996, vol. 10, No. 8.

Brooks, "Looking for Data in all the Wrong Places; Finding Data in Free-Form Data Sources, Technology Information," *DBMS*, Oct. 1997, vol. 11, No. 10, p. 70.

Courtois et al., "Cool Tools for Searching the Wet; World Wide Web Search Databases; Includes Related Articles," Online, Nov. 1995, vol. 19, No. 6 p. 14.

Jurvis, "Serving up Knowledge," Informationweek, Nov. 1997, vol. 657, pp. 141-150.

Klinger, "Search the Internet the Easy Way," *LAN Times*, May 1997, vol. 14, No. 10, p. 56.

Munro, "Filtering Utilities," *PCT Magazine*, Apr. 1997, vol. 16, No. 7, p. 235.

Munson, "World Wide Web Indexes and Hierarchical Lists: Finding Tools for the Internet," *Computers in Libraries*, Jun. 1996, vol. 16, No. 6, p. 54.

Notess, "Northern Light: New Search Engine for the Web and Full-Text Articles; Includes Related Article," *Database*, Feb. 1998, vol. 21, No. 1, p. 32.

Paul, "News Archives: One-stop Shopping, Boutique Hopping and the Specialty News Search Site: Includes Related Article Battle of the Search Engines," *Searcher*, Jan. 1998, vol. 6, No. 1, p. 64.

Sheldon et al., "Discover: A Resource Discovery System Based on Content Routing," *Computer Networks and ISDN Systems*, Apr. 1995, vol. 27, No. 6, pp. 953-972.

\* cited by examiner

| | | rating table ⟋ 300 |
|---|---|---|
| term | page URL | score |
| ⋮ | ⋮ | |
| 301 — dynamics | www.science.edu/physics | 1 |
| 302 — dynamics | www.cogpsych.org/article0132.html | 22 |
| 303 — dynamics | www.herald.com/localnews/0134.asp | 7 |
| | ⋮ | |
| 304 — human | www.reading.org | 16 |
| 305 — human | www.cogpsych.org/article0132.html | 45 |
| 306 — human | www.unicef.org/hunger_campaign.html | 3 |
| | ⋮ | |

*FIG. 3*

| term | page URL | score |
|---|---|---|
| ⋮ | ⋮ | |
| dynamics | www.science.edu/physics | 1 |
| dynamics | www.cogpsych.org/article0132.html | 23 |
| dynamics | www.herald.com/localnews/0134.asp | 7 |
| ⋮ | ⋮ | |
| human | www.reading.org | 16 |
| human | www.cogpsych.org/article0132.html | 46 |
| human | www.unicef.org/hunger_campaign.html | 3 |
| ⋮ | ⋮ | | rating table 400

401 — dynamics / www.science.edu/physics / 1
402 — dynamics / www.cogpsych.org/article0132.html / 23
404 — dynamics / www.herald.com/localnews/0134.asp / 7
404 — human / www.reading.org / 16
405 — human / www.cogpsych.org/article0132.html / 46
406 — human / www.unicef.org/hunger_campaign.html / 3

*FIG. 4*

| term | page URL | score |
|---|---|---|
| ⋮ | | |
| dynamics | www.science.edu/physics | 4 |
| dynamics | www.cogpsych.org/article0132.html | 116 |
| dynamics | www.reading.org | 2 |
| dynamics | www.herald.com/localnews/0134.asp | 45 |
| ⋮ | | |
| human | www.reading.org | 77 |
| human | www.cogpsych.org/article0132.html | 211 |
| human | www.unicef.org/hunger_campaign.html | 12 |
| ⋮ | | | rating table — 600
601 — dynamics / www.science.edu/physics / 4
602 — dynamics / www.cogpsych.org/article0132.html / 116
607 — dynamics / www.reading.org / 2
603 — dynamics / www.herald.com/localnews/0134.asp / 45
604 — human / www.reading.org / 77
605 — human / www.cogpsych.org/article0132.html / 211
606 — human / www.unicef.org/hunger_campaign.html / 12

*FIG. 6*

IDENTIFYING THE ITEMS MOST RELEVANT TO A CURRENT QUERY BASED ON USER ACTIVITY WITH RESPECT TO THE RESULTS OF SIMILAR QUERIES

TECHNICAL FIELD

The described technology is directed to the field of query processing.

BACKGROUND

Web search engines permit users to search for particular web sites within the range of known web sites. In many cases, users perform searches in order to ultimately find a single page.

In order to perform a search, a user submits a query containing one or more query terms. For example, a user may submit a query to the web search engine containing terms that the user believes are words contained by a web page sought by the user. A query server program processes the query to identify pages matching the terms of the query. The pages identified by the query server program are individually known as results, and collectively known as a result set. The result set is typically displayed to the user as a list of results each describing one of the identified pages. This list may be ordered in various ways. For example, the list may be ordered based on the extent to which the identified page corresponding to each result matches the terms of the query.

For many queries, it is common for result sets to contain tens or hundreds of results. Where the user is performing the search in order to find a single page, the application of conventional approaches to ordering the result set often fail to place the sought page or pages near the top of the result set, so that the user must read through many other results in the result set before reaching the sought page. In view of this disadvantage of conventional approaches to ordering result sets, a new, more effective technique for automatically ordering result sets in accordance with collective and/or individual user behavior would have significant utility.

BRIEF DESCRIPTION OF THE DRAWINGS

FIGS. 3 and 4 are table diagrams showing augmentation of a sample rating table.

FIG. 6 is a table diagram showing a rating table for a composite period.

DETAILED DESCRIPTION

Figure 1:
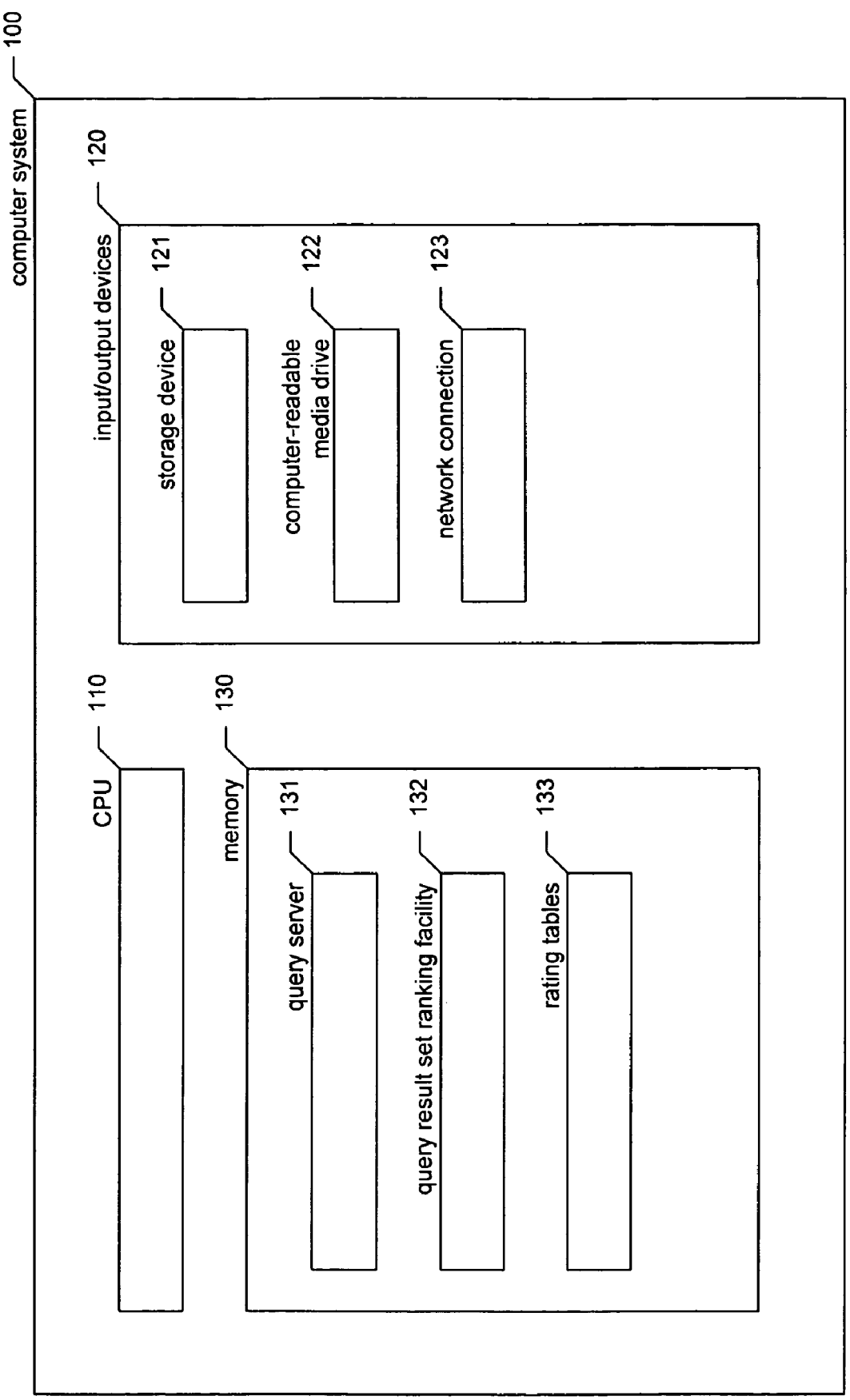
FIG. 1 is a block diagram showing some of the components typically incorporated in at least some of the computer systems and other devices on which the facility executes.

A software facility for identifying items most relevant to a current query based on user activity with respect to the result sets produced for similar queries ("the facility") is described. In some embodiments, the facility generates ranking values for results each corresponding to a web page indicating the web page's level of relevance to a current query specifying one or more query terms. The facility generates a ranking value for a result by combining a group of rating scores, each corresponding to the level of relevance of the corresponding web page to a different one of the query terms specified by the current query. The facility adjusts rating scores for combinations each of a web page with a query term. The facility maintains a rating score for a particular combination of a web page with a query term based upon user activity with respect to that web page within result sets produced for queries containing the query term. In some environments, the facility employs a browser toolbar or other client-side program to monitor and report relevant user activity.

In some embodiments, the facility maintains rating scores in a manner that increases the rating scores for combinations of a result page with each of the query terms contained in the query that produced the result set containing the result in response to observing one or more of the following user actions regarded as demonstrating relevance of the result to these query terms: the user prints the page corresponding to the result or a downstream page (i.e., a page to which the user navigated from the result page); the user highlights content, such as text, in the page corresponding to the result or a downstream page; the user copies content, such as text, from the page corresponding to the result or a downstream page; the user pastes content, such as text, copied from the page corresponding to the result or a downstream page; the user bookmarks the page corresponding to the result or the downstream page; the user searches within the page corresponding to the result or the downstream page; the user posts form content from the page corresponding to the result or a downstream page, particularly where the post is a secure post; the user annotates the page corresponding to the result or the downstream page; the user clicks-through from the page corresponding to the result to another page in the same Internet domain; the user forwards to another user a link to the page corresponding to the result; the user responds affirmatively to an explicit inquiry about the usefulness of the page corresponding to the result page; the user views the web page for at least a threshold amount of time; and where there is a time-indexed media resource—such as an audio resource or a video resource—on or associated with the web page corresponding to the result, the user plays at least a threshold percentage of the time-indexed media resource.

In some embodiments, the facility maintains rating scores in a manner that decreases the rating scores for combinations of a page with each of the query terms contained in the query that produced the result set containing a page corresponding to the result in response to observing one or more of the following user actions regarded as demonstrating irrelevance of the page corresponding to the result to these query terms: after opening the page corresponding to the result, the user submits a new query; the user clicks-through from the page corresponding to the result to a page in a different Internet domain; and the user responds negatively to an explicit inquiry about the usefulness of the web page corresponding to the result.

In some embodiments, in addition to adjusting the rating scores for combinations of the page corresponding to the result with each of the query terms contained in the query that produced the result set containing the result, the facility also adjusts the rating scores for combinations of the page with other terms not contained in the query, such as one or more of the following: text associated with the link in the result set to the page corresponding to the result, such as anchor tag text or title attribute text specified for the link to the page corresponding to the result; and text associated with the page corresponding to the result, such as page title text or text contained elsewhere in the page. In some embodiments, the facility filters such terms based upon factors such as: whether the term is on a list of noise words; whether the term tends to differentiate and whether the term has a positive association with at least one of the query terms.

In some embodiments, the facility maintains and applies scores for de-duplicated versions of web pages to more accurately handle web pages that are referred to by multiple URLs.

By generating result set ranking values in some or all of the ways described above, the facility increases the likelihood that results of interest to the user are prominently featured in the result set.

FIG. 1 is a block diagram showing some of the components typically incorporated in at least some of the computer systems and other devices on which the facility executes. These computer systems and devices 100 may include one or more central processing units ("CPUs") 110 for executing computer programs; input/output devices 120; and a computer memory 130 for storing programs and data—including data structures—while they are being used. The input/output devices typically include a persistent storage device 121, such as a hard drive, for persistently strong programs and data; a computer-readable media drive 122, such as a CD-ROM drive, for reading programs and data stored on a computer-readable medium; and a network connection 123 for connecting the computer system to other computer systems, such as the Internet, to exchange programs and/or data—including data structures. The memory 130 typically contains a query server 131 for general inquiry results from queries, a result set ranking facility 132 for automatically ranking the results in a result set in accordance with prior user activities, and rating tables 133 containing rating scores used by the facility. While computers systems configured as describe above are typically used to support the operation of the facility, one of ordinary skill in the art will appreciate that the facility may be implemented using devices of various types and configurations, and having various components.

Figure 2:
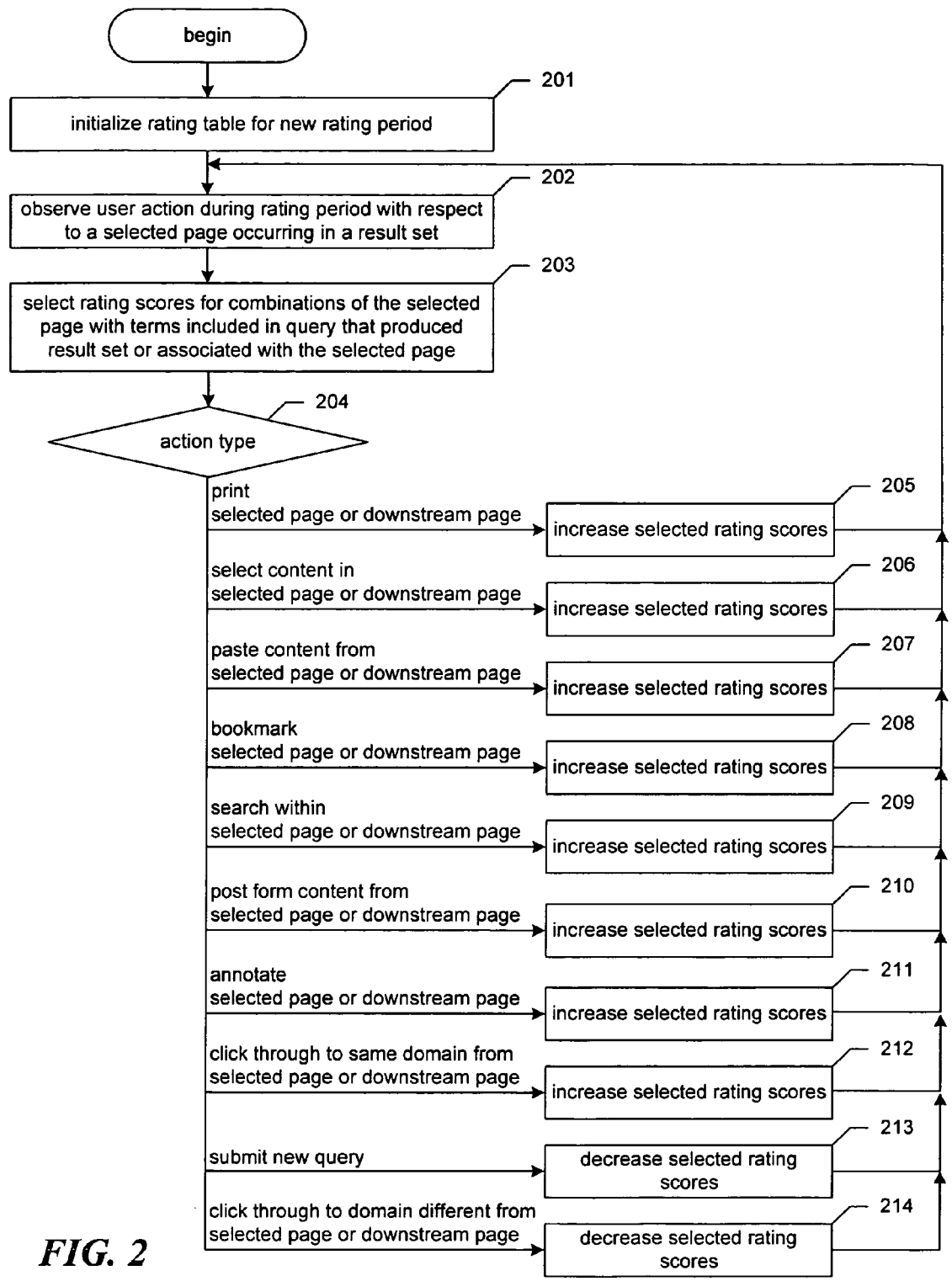
FIG. 2 is a flow diagram showing steps typically performed by the facility in order to generate a new rating table.

The facility typically generates a new rating table periodically, and, when a result set is received, uses the last-generated rating table to rank the results in the result set. The rating table may be generated for the queries occurring during a period of time such as a day, a week, or month. This group of queries is termed a "rating set" of queries. FIG. 2 is a flow diagram showing steps typically performed by the facility in order to generate a new rating table for a rating period. In step 201, the facility initializes a rating table for holding entries each indicating the rating score for a particular combination of a query term and a page URL. The rating table usually has no entries when it is initialized. In step 202, the facility observes a user action during the rating period with respect to a selected page occurring in a query result. Such observation may be performed using techniques described in one or more of the following, each of which is hereby incorporated by reference in its entirety: U.S. Pat. No. 6,549,941; U.S. Pat. No. 6,691,163; and U.S. patent application Ser. No. 09/447, 392, filed on Nov. 22, 1999. In step 203, the facility selects ratings scores for combinations of the selected page with terms included in the query that produce the query result, and/or with terms associated with the selected page, such as the pages title or other text in the page, or text associated with the link in the query result to the page, such as anchor tag text or title attribute text of the link. In some embodiments, to determine the anchor tag text associated with a link to a page in a query result traversed by the user, the facility uses a browser toolbar to query a link text attribute of an object passed in an event notification generated in response to the user's traversal of the link. In some embodiments, the facility uses a de-duplicated version of the URL for the selected page in selecting the rating scores.

In step 204, the facility branches on the type of the action observed in step 202 to adjust the rating scores selected in step 203. For the following action types, the facility typically increases each of the selected rating scores in steps 205-212: print the selected page or a downstream page; select content in the selected page or a downstream page; paste content from the selected page or a downstream page; bookmark the selected page or a downstream page; search within the selected page or a downstream page; post form content from a selected page or a downstream page; annotate the selected page or a downstream page; click through the selected page or a downstream page to a page in the same domain; forward to another user a link to the selected page (not shown); respond affirmatively to an explicit inquiry about the usefulness of the selected page (not shown); view the selected page for at least a threshold amount of time (not shown); or play at least a threshold percentage of a time-indexed media resource associated with the selected page (not shown). For the following action types, the facility typically decreases each of the selected rating scores in steps 213-214: submitting a new query after selecting the selected page; click through from the selected page or a downstream page to a page that is in a different Internet domain from the selected page or the downstream page; or respond negatively to an explicit query about the usefulness of the selected page (not shown). In some embodiments, the facility increases the selected rating scores when an action of a particular type is performed in certain circumstances, and decreases the selected rating scores when an action of that type is performed in other circumstances. For example, in some embodiments, when the user submits a subsequent query that is unrelated to the prior query, the facility reduces the rating selected for the prior query, while when the user submits a subsequent query that constitutes a refinement of the prior query, the facility increases rating scores selected for the prior query. Where an entry does not yet exist in the rating table for a selected term and page, the facility adds a new entry to the rating table for the selected term and page. Increasing or decreasing a rating score typically involves adding or subtracting an increment value, such as 1, to the existing rating score for the term and item. In some embodiments, the facility may add varying increment values depending upon the type or extent of the observed user action. In some embodiments (not shown), the facility augments the selected rating scores based upon a volume of communication events between the client and the server that follows the user's selection of the selected page from the result set. For example, where the selected page employs Ajax user interface techniques, the facility can augment the selected ratings score to a greater degree for greater levels of user interaction with such user interfaces. After any of steps 205-214, the facility continues in step 202 to observe the next user action.

Those skilled in the art will appreciate that the steps shown in FIG. 2 and in each of the flow diagrams discussed below may be altered in a variety of ways. For example, the order of the steps may be rearranged; substeps may be performed in parallel; shown steps may be omitted, or other steps may be included; etc.

FIGS. 3 and 4 are table diagrams showing augmentation of a sample rating table in accordance with FIG. 2. FIG. 3 shows the state of the sample rating table before its augmentation. It can be seen that the table 300 contains a number of entries, including entries 301-306. Each entry contains the rating score for a particular combination of a query term and a page URL identifying a page. For example, entry 302 identifies the score "22" for the term "dynamics" the page URL "www.cogpsych.org/article0132.html". It can be seen by examining entries 301-303 that, in query results produced from queries including the term "dynamics", the page having URL "www.cogpsych.org/article0132.html" has been the subject of more positive user page interaction than the page having the URL "www.herald.com/localnews/0134.asp", and much more positive user interaction than the page having the URL "www.science.edu/physics". In some embodiments, the facility uses various types of data structures to store the rating scores, such as sparse arrays.

While FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

In augmenting the rating table 300, the facility observes a positive user action with respect to the page having the URL "www.cogpsych.org/article0132.htm" from a result set produced by a query specifying the query terms "human" and "dynamics". FIG. 4 shows the state of the sample rating table after the rating table is augmented by the facility to reflect this user action. It can be seen by comparing entry 405 in rating table 400 to entry 305 in rating table 300 that the facility has incremented the score for this entry from "45" to "46". Similarly, the facility has incremented the rating score for the same URL the term "dynamics" from "22" to "23". Although the increment values reflected in the differences between FIGS. 3 and 4 are both 1, as noted above, different increment values may be used for different actions, either positive or negative. The facility augments the rating table in a similar manner for the other actions in query results that it identifies during the time period.

Figure 5:
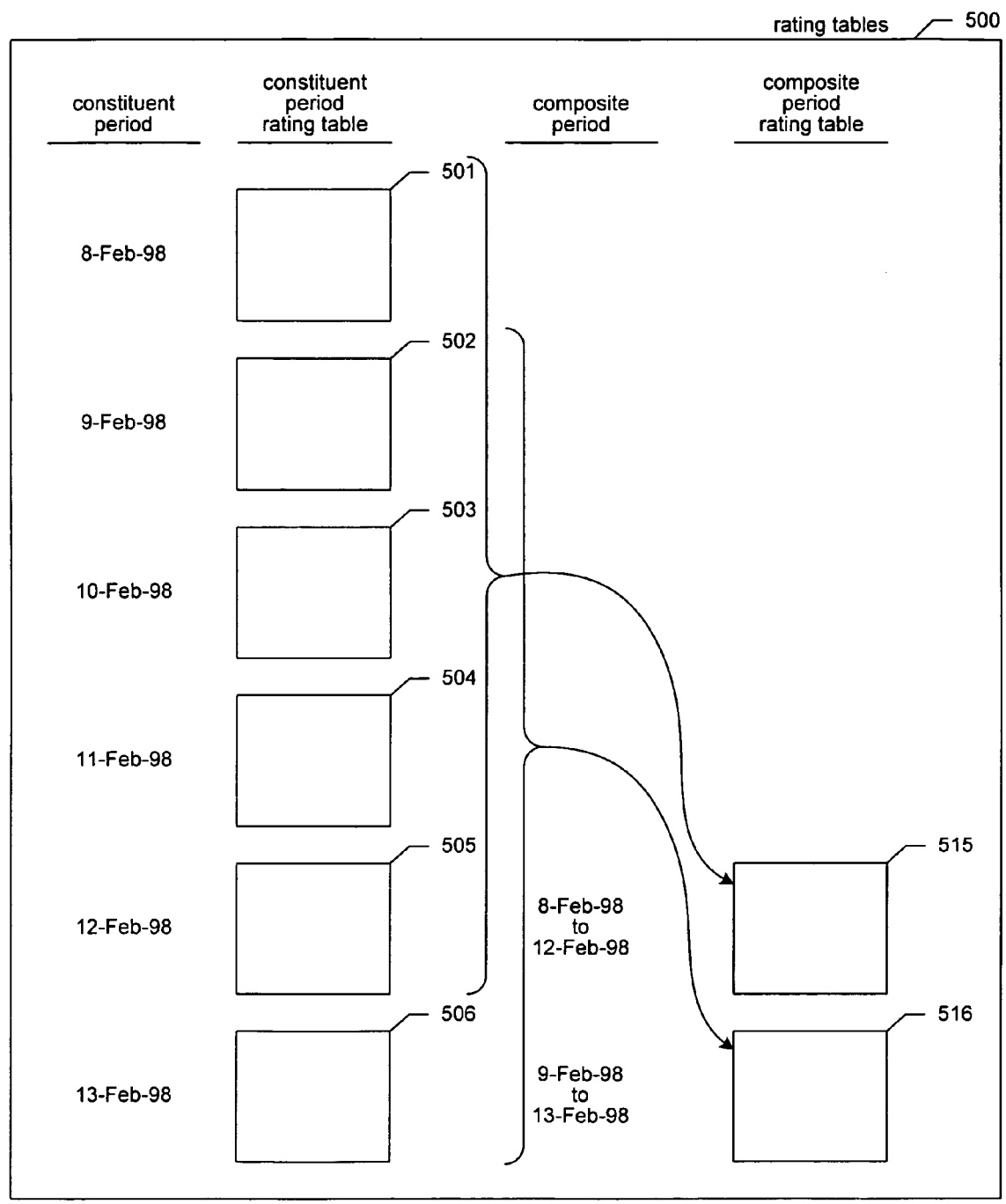
FIG. 5 is a table diagram showing the generation of rating tables for composite periods of time from rating tables for constituent periods of time.

Rather than generating a new rating table from scratch using the steps shown in FIG. 2 each time new selection information becomes available, in some embodiments, the facility generates and maintains separate rating tables for different constituent time periods of a relatively short length, such as one day. Each time a rating table is generated for a new constituent time period, the facility typically combines this new rating table with existing rating tables for earlier constituent time periods to form a rating table for a longer composite period of time. FIG. 5 is a table diagram showing the generation of rating tables for composite periods of time from rating tables for constituent periods of time. It can be seen in FIG. 5 that rating tables 501-506 each correspond to a single day between 8 Feb. 1998 and 13 Feb. 1998. Each time a new constituent period is completed, the facility generates a new rating table reflecting the user selections made during that constituent period. For example, at the end of 12 Feb. 1998, the facility generates rating table 505, which reflects all of the user selections occurring during 12 Feb. 1998. After the facility generates a new rating table for a completed constituent period, the facility also generates a new rating table for a composite period ending with that constituent period. For example, after generating the rating table 505 for the constituent period 12 Feb. 1998, the facility generates rating table 515 for the composite period 8 Feb. 1998 to 12 Feb. 1998. The facility typically generates such a rating table for a composite period by combining the entries of the rating tables for the constituent periods making up the composite period, and combining the scores of corresponding entries, for example, by summing them. In one preferred embodiment, the scores and rating tables for more recent constituent periods are weighted more heavily than those in rating tables for less recent constituent periods. When ranking result sets, the rating table for the most recent composite period is typically used. That is, until rating table 516 can be generated, the facility typically uses rating table 515 to rank result sets. After rating table 516 is generated, the facility typically uses rating table 516 to rank result sets. In some embodiments, the lengths of both constituent periods and composite periods are configurable.

In some embodiments, rather than segregating rating information into separate rating tables for constituent periods of time as shown in FIG. 5, the facility aggregates all such data into a single table and decays the data over time, such as by subtracting a fixed value from all of the rating scores periodically, such as every day, or by periodically dividing each rating score by a fixed value.

FIG. 6 is a table diagram showing a rating table for a composite period. By comparing the item rating table 600 shown in FIG. 6 to item rating table 400 shown in FIG. 4, it can be seen that the contents of rating table 600 constitute the combination of the contents of rating table 400 with several other rating tables for constituent periods. For example, the score for entry 602 is "116", or about five times the score for corresponding entry 402. Further, although rating table 400 does not contain an entry for the term "dynamics" and the URL "www.reading.org", entry 607 has been added to table 600 for this combination of term and page, as a corresponding entry occurs in a rating table for one of the other constituent periods within the composite period.

Figure 7:
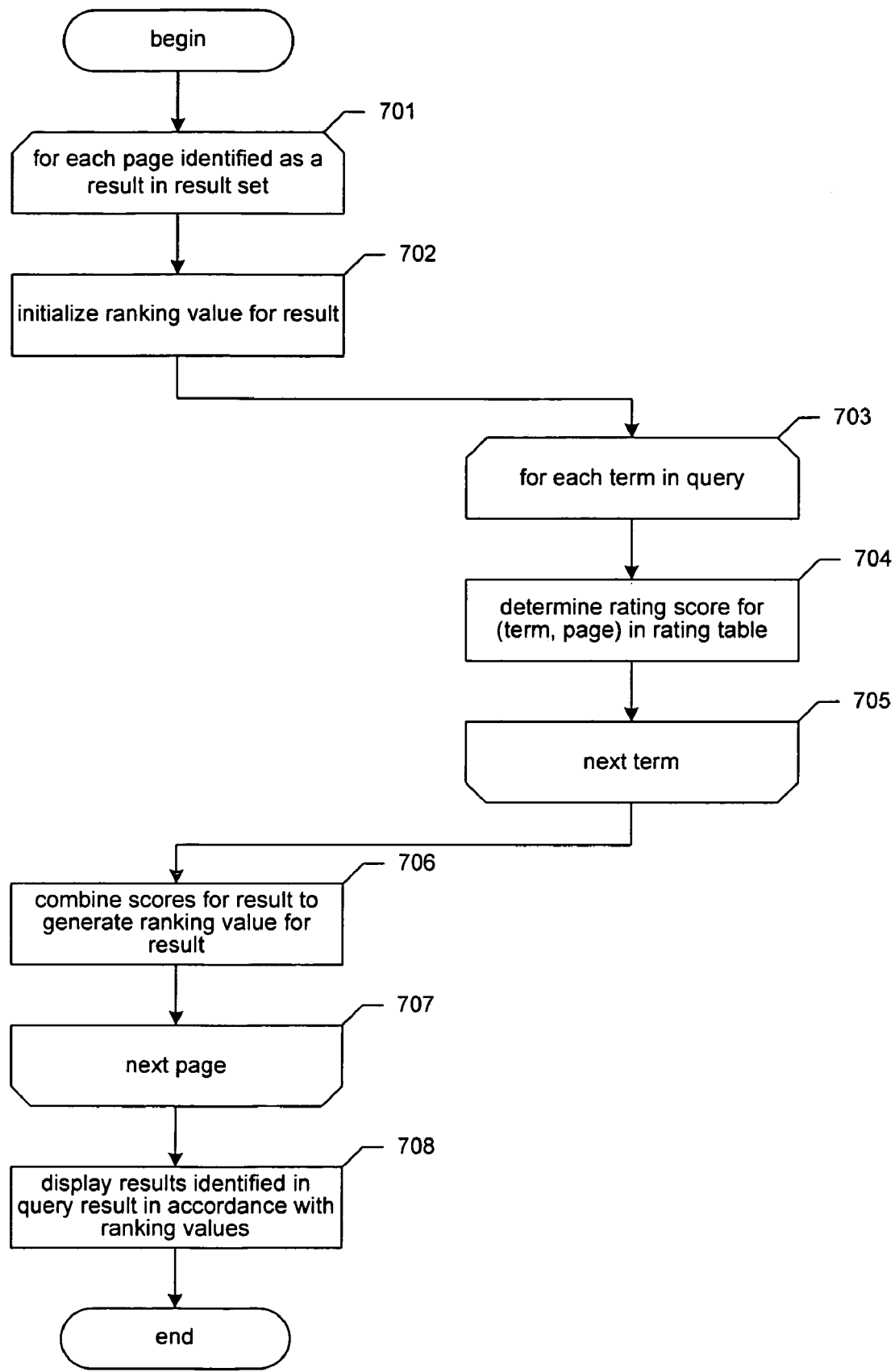
FIG. 7 is a flow diagram showing steps typically performed by the facility to order a result set using a rating table by generating a ranking value for each result in the result set.

The facility uses rating tables that it has generated to generate ranking values for items in new result sets. FIG. 7 is a flow diagram showing steps typically performed by the facility to order a result set using a rating table by generating a ranking value for each result in the result set. In steps 701-707, the facility loops through each result identified in the result set. In step 702, the facility initializes a ranking value for the current result. In steps 703-705, the facility loops through each term occurring in the query. In step 704, the facility determines the rating score contained by the most recently-generated rating table for the current term and the page corresponding to the current result. In step 705, if any terms of the query remain to be processed, then the facility loops up to step 703, else the facility continues in step 706. In step 706, the facility combines the scores for the current result to generate a ranking value for the result. As an example, with reference to FIG. 6, in processing the page having the URL "www.cogpsych.org/article0132.html", the facility combines the score "116" extracted from entry 602 for this page and the term "dynamics", and the score "211" extracted from entry 605 for this page and the term "human". In some embodiments, the combination of step 706 involves summing these scores. These scores may be combined in other ways, however. In particular, scores may be adjusted to more directly reflect the number of query terms that are matched by the page, so that items that match more query terms than others are favored in the ranking. In step 707, if any results remain to be processed, the facility loops back to step 701 to process the next result, else the facility continues in step 708. In step 708, the facility displays the results identified in the result set in accordance with the ranking values generated for the pages in step 706. In some embodiments, step 708 involves sorting the results in the result set in decreasing order of their ranking values, and/or subsetting the results in the result set to include only those items above a threshold ranking value, or only a predetermined number of results having the highest ranking values. After step 708, these steps conclude.

In some embodiments, the facility uses stemming techniques to combine rating scores for query terms having the same root as query terms occurring in the query. In different embodiments of the facility, the stemming techniques are incorporated in different ways. As a first example, in the rating table shown in FIGS. 3 and 4, the term column containing terms occurring in queries may be replaced with a term root column containing the roots of the terms occurring in queries. For instance, when pages are the subject of a positive user action in a query containing the terms "human" and "dynamics," the facility would increment scores for rating table rows containing the term roots "human" and "dynamic"—the roots obtained by stemming those terms.

In a second example, the facility expands the terms occurring in a query from whose query result an item is selected to all of the different terms that share the same root as the term occurring in the query. For example, for a query containing the term "dynamics," the facility would increment the score for rows with the item rating table containing the terms "dynamic," "dynamics," "dynamism," "dynamist," "dynamistic," and "dynamically."

In a third example, the facility continues to update the rating table without any use of stemming as described above, but in reading the rating table, such as in step 704, the facility combines, for each term occurring in the query at issue, the scores for all of the terms bearing the same root with the terms occurring in the query. For example, if the facility received a query containing the term "dynamics," the facility would combine with the score for this term the scores for the additional terms "dynamic," "dynamism," "dynamist," "dynamistic," and "dynamically," which all share the root "dynam-." Other approaches to utilizing stemming are part of additional embodiments of the facility.

In some embodiments, the facility uses the search engine that produces the query results in response to queries to perform its query result processing, in some cases using some or all of the techniques described in U.S. patent application Ser. No. 11/097,468, filed on Mar. 31, 2005.

In some embodiments, the facility is implemented as a web service that is invoked against a result set produced by a separate search engine.

It will be appreciated by those skilled in the art that the above-described facility may be straightforwardly adapted or extended in various ways. For example, the facility may use a variety of techniques for observing user actions with respect to results listed in result set, including various client-side, server-side, or proxy-based techniques. The facility may be used in connection with documents or other content items of a variety of types other than web pages—such as various types of content items accessed via URIs, file system names and/or paths, or other addressing and/or accessing schemes—navigated to and/or interacted with by users using devices of any of a variety of types, via communications channels of any of a variety of types. The facility may use various formulae to determine; in the case of each user action, the amount by which to augment rating scores with respect to the action. Further, the facility may employ various formulae to combine rating scores into a ranking value for a result. Additionally, the facility may augment the rating table to reflect actions by users other than human users, such as software agents or other types of the artificial users. While the foregoing description makes reference to particular embodiments, the scope of the invention is defined solely by the claims that follow and the elements recited therein.

We claim:

1. A computer-implemented method for ranking web pages in a result set, comprising:
   under control of one or more computer systems configured with executable instructions,
   establishing, in response to receiving a query containing one or more query terms, a plurality of rating scores, a first subset of the plurality of rating scores reflecting a first determined level of relevance of one of a plurality of web pages generated in response to the query to one of a plurality of query terms, a second subset of the plurality of rating scores reflecting a second determined level of relevance of the one of the plurality of web pages generated in response to the query to one of a plurality of terms not included in the query terms and associated with the one of the plurality of web pages;
   observing interaction of a plurality of users with a selected web page of the plurality of web pages during a rating period to detect any of a type of content interaction, each of the type of content interaction being performed with respect to the selected web page, the type of content interaction comprising printing the content and copying the content;
   in response to detecting any of the type of content interaction performed by any of the plurality of users,
   adjusting at least one of the established first subset of the plurality of rating scores for at least one combination of the selected web page and a query term among the one or more query terms, the rating score being adjusted by an amount based at least in part upon the detected content interaction, the adjustment to the rating score being configured to be positive based at least in part on the detected content interaction, each adjustment to the rating score corresponding to an inferred relevance of the web page to one of the query terms; and
   adjusting at least one of the established second subset of the plurality of rating scores for at least one combination of the selected web page and one of the plurality of terms not included in the query terms and associated with the one of the plurality of web pages, the rating score being adjusted by an amount based at least in part upon the detected content interaction, the adjustment to the rating score being configured to be positive based at least in part on the detected content interaction, each adjustment to the rating score corresponding to an inferred relevance of the selected web page to the one of the plurality of terms; and
   for each of a plurality of web pages included generated in response to the query:
   selecting established and adjusted rating scores for each combination of the web page and a query term and for each combination of the web page and a term not included in the query terms, and
   determining a ranking score for the web page by combining the selected rating scores.

2. The computer-implemented method of claim 1, further comprising causing the web pages included in the distinguished result set to be displayed in accordance with the determined ranking scores.

3. The computer-implemented method of claim 1, further comprising causing the web pages included in the distinguished result set to be displayed in an order corresponding to the determined ranking scores.

4. The computer-implemented method of claim 1, further comprising using the determined ranking scores to select a proper subset of the web pages included in the distinguished query result for display.

5. The computer-implemented method of claim 1 wherein at least one rating score for a distinguished web page is adjusted in a positive direction in response to a content interaction in which a user prints content of the distinguished web page.

6. The computer-implemented method of claim 1 wherein at least one rating score for a distinguished web page is adjusted in a positive direction in response to a content interaction in which a user highlights content of the distinguished web page.

7. The computer-implemented method of claim 1 wherein at least one rating score for a distinguished web page is adjusted in a positive direction in response to a content interaction in which a user copies content of the distinguished web page.

8. The computer-implemented method of claim 1 wherein at least one rating score for a distinguished web page is adjusted in a positive direction in response to a content interaction in which a user pastes content copied from the distinguished web page.

9. The computer-implemented method of claim 1 wherein at least one rating score for a distinguished web page is adjusted in a positive direction in response to a content interaction in which a user bookmarks the distinguished web page.

10. The computer-implemented method of claim 1 wherein at least one rating score for a distinguished web page is adjusted in a positive direction in response to a content interaction in which a user searches within the distinguished web page.

11. The computer-implemented method of claim 1 wherein at least one rating score for a distinguished web page is adjusted in a positive direction in response to a content interaction in which a user posts form content from the distinguished web page.

12. The computer-implemented method of claim 1 wherein at least one rating score for a distinguished web page is adjusted in a positive direction in response to a content interaction in which a user annotates the distinguished web page.

13. The computer-implemented method of claim 1 wherein at least one rating score for a distinguished web page is adjusted in a positive direction in response to a content interaction in which a user follows a link in the distinguished web page to another web page in the Internet domain of the distinguished web page.

14. The computer-implemented method of claim 1 wherein at least one rating score for a distinguished web page is adjusted in a positive direction in response to at least a threshold volume of communications events between client and server while a user is viewing the distinguished web page to another web page in the Internet domain of the distinguished web page.

15. The computer-implemented method of claim 1 wherein at least one rating score for a distinguished web page is adjusted in a negative direction in response to a content interaction in which a user follows a link in the distinguished web page to another web page in the Internet domain of the distinguished web page.

16. The computer-implemented method of claim 1 wherein at least one rating score for a distinguished web page is adjusted in a negative direction in response to a content interaction in which a user follows a link in the distinguished web page to a web page in an Internet domain other than that of the distinguished web page.

17. The computer-implemented method of claim 1 wherein at least one rating score for a distinguished web page is adjusted in response to a content interaction performed with respect to a web page reached by the user by following a link in the distinguished web page.

18. A computer-readable storage medium whose contents cause at least one computing system to perform a method for scoring the relevance of documents to terms, the method comprising:

under control of the at least one computer system configured with executable instructions, initializing a first set of rating scores for combinations of a plurality of documents with a plurality of query terms included in a plurality of queries, each rating score of the first set of rating scores reflecting a first determined level of relevance of one of the plurality of documents to one of the plurality of~terms, the plurality of documents being returned in response to the plurality of queries;

initializing a second set of rating scores for combinations of the plurality of documents with a plurality of terms not included in the query terms, the plurality of terms being associated with the plurality of documents, each rating score of the second set of rating scores reflecting a second determined level of relevance of one of the plurality of documents to one of the plurality of terms;

observing interaction of a plurality of users with respect to a selected document of the plurality of documents during a rating period to detect any of a type of content interaction, each of the type of content interaction being performed by a user with respect to the selected document when included in a result set generated in response to a query comprising one or more query terms from the plurality of query terms, the type of content interaction comprising highlighting content of the document and annotating content of the selected document; and in response to detecting each of the type of content interaction performed by any of the plurality of users, adjusting a rating score of the first set of rating scores for at least one combination of the selected document with respect to which the action was performed and a term among the one or more query terms, the rating score being adjusted by an amount based at least in part upon the detected content interaction, the adjustment to the rating score being configured to be positive based at least in part on the detected content interaction, each adjustment to the rating score corresponding to an inferred relevance of the selected document to the query term; and adjusting a rating score for at least one combination of the selected document with respect to which the action was performed and one of the plurality of terms not included in the query terms and associated with the selected document, the rating score being adjusted by an amount based at least in part upon the detected content interaction, the adjustment to the rating score being configured to be positive based at least in part on the detected content interaction, each adjustment to the rating score corresponding to an inferred relevance of the selected document to the one of the plurality of terms;

for each of a plurality of documents included in a distinguished result set produced in response to a distinguished query comprising a set of distinguished query terms, at least:

selecting ratings for each combination of the document and a query term among the distinguished set of query terms, and determining a ranking score for the document in the distinguished result set by combining the selected ratings.

19. The computer-readable storage medium of claim 18 wherein the type of content interaction further comprises printing content of the document.

20. The computer-readable storage medium of claim 18 wherein the type of content interaction further comprises copying content of the document.

21. The computer-readable storage medium of claim 18 wherein the type of content interaction further comprises pasting content copied from the document.

22. The computer-readable storage medium of claim 18 wherein the type of content interaction further comprises bookmarking the document.

23. The computer-readable storage medium of claim 18 wherein the type of content interaction further comprises searching within the document.

24. The computer-readable storage medium of claim 18 wherein the type of content interaction further comprises securely posting form contents from within the document.

25. The computer-readable storage medium of claim 18 wherein the type of content interaction further comprises following a link in the document to another document from the same source.

26. The computer-readable storage medium of claim 18 wherein, for at least one observed action, a rating for each combination of the document with which the action was performed and a term among the terms comprising the query in response to which the result set was generated is adjusted where the action is of the type interacting with the document to produce at least a threshold volume of communication events with a source of the document.

27. The computer-readable storage medium of claim 18 wherein, for at least one observed action, a rating for each combination of the document with which the action was performed and a term among the terms comprising the query in response to which the result set was generated is adjusted where the action is of the type submitting a new query after viewing the document.

28. The computer-readable storage medium of claim 18 wherein, for at least one observed action, a rating for each combination of the document with which the action was performed and a term among the terms comprising the query in response to which the result set was generated is adjusted where the action is of the type following a link in the document to another document from a source other than the source of the document.

29. The computer-readable storage medium of claim 18 wherein the type of content interaction further comprises interacting with the content of the document to produce at least a threshold volume of communication events with a source of the document.

30. The computer-readable storage medium of claim 18 wherein the type of content interaction further comprises playing at least a threshold percentage of a time-indexed media resource embedded in the document.

* * * * *